(12) United States Patent
Kim et al.

(10) Patent No.: US 7,253,856 B2
(45) Date of Patent: Aug. 7, 2007

(54) LIQUID CRYSTAL DISPLAY DEVICE HAVING AN IMPROVED APERTURE RATIO AND METHOD FOR FABRICATING THE SAME

(75) Inventors: Gi-Hong Kim, Anyang-si (KR); Hyung-Ki Hong, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/134,694

(22) Filed: Apr. 30, 2002

(65) Prior Publication Data
US 2003/0090608 A1    May 15, 2003

(30) Foreign Application Priority Data
Nov. 15, 2001  (KR) ............................... 2001-70902

(51) Int. Cl.
*G02F 1/1333* (2006.01)

(52) U.S. Cl. .................. 349/110; 349/129; 349/145

(58) Field of Classification Search .............. 349/44, 349/110, 129, 128, 123, 145, 146, 43, 143
See application file for complete search history.

(56) References Cited

U.S. PATENT DOCUMENTS 5,781,260 A * 7/1998 Miyazawa ................ 349/111
5,907,380 A * 5/1999 Lien ......................... 349/141
5,940,056 A * 8/1999 Hanazawa et al. .......... 345/87
6,011,604 A   1/2000 Miyazawa
6,067,140 A * 5/2000 Woo et al. ................. 349/129
6,297,862 B1 * 10/2001 Murade ...................... 349/44
6,449,025 B2 * 9/2002 Lee .......................... 349/129

FOREIGN PATENT DOCUMENTS

JP      7-175056      7/1995
KR      1996-11494    2/1999

* cited by examiner

*Primary Examiner*—Thoi V. Duong
(74) *Attorney, Agent, or Firm*—Morgan, Lewis & Bockius LLP

(57) ABSTRACT

A liquid crystal display device includes first and second substrates facing and spaced apart from each other, a common electrode on an inner surface of the first substrate, a gate line on an inner surface of the second substrate, a data line crossing the gate line, a switching device connected to the gate and data lines, a first pixel electrode connected to the switching device and spaced apart from the data line, a black matrix covering the data line and having a first portion width extending from a center line of the data line to a first edge of the black matrix, and a second portion width different from the first portion width extending from the center line of the data line to a second edge of the black matrix opposite to the first edge of the black matrix, and a liquid crystal material layer interposed between the first pixel electrode and common electrode.

28 Claims, 14 Drawing Sheets

BACK LIGHT

LIQUID CRYSTAL DISPLAY DEVICE HAVING AN IMPROVED APERTURE RATIO AND METHOD FOR FABRICATING THE SAME

The present invention claims the benefit of Korean Patent Application No. 2001-70902, filed in Korea on Nov. 15, 2001, which is hereby incorporated by reference.

BACKGROUND OF THE INVENTION

1. Field of the Invention

The present invention relates to a liquid crystal display (LCD) device, and more particularly, to a LCD device having an improved aperture ratio.

2. Description of the Related Art

Presently, LCD devices are developed as next generation display devices because of their light weight, thin profile, and low power consumption characteristics. In general, an LCD device is a non-emissive display device that displays images using a refractive index difference utilizing optical anisotropy properties of liquid crystal material that is interposed between an array (TFT) substrate and a color filter (C/F) substrate. Among the various type of LCD devices commonly used, active matrix LCD (AM-LCD) devices have been developed because of their high resolution and superiority in displaying moving images. The AM-LCD device includes a thin film transistor (TFT) per each pixel region as a switching device, a first electrode for ON/OFF, and a second electrode used for a common electrode.

FIG. 1 is a perspective view of an LCD device according to the related art. In FIG. 1, first and second substrates 10 and 30 are arranged to face each other with a liquid crystal material layer 50 interposed therebetween. On an inner surface of the first substrate 10, a color filter (C/F) layer 12 and a common electrode 16, which functions as one electrode for applying an electric field to the liquid crystal layer 50, are subsequently formed. The color filter layer 12 includes a color filter for passing only light of a specific wavelength, and a black matrix (not shown) that is disposed at a boundary of the color filter and shields light of a region in which alignment of the liquid crystal material is uncontrollable. On an inner surface of the second substrate 30, a plurality of gate lines 32 and a plurality of data lines 34 are formed in a matrix array. A TFT "T", which functions as a switching device, is disposed at a region where each gate line 32 and data line 34 crosses, and a pixel electrode 46 that is connected to the TFT "T" is disposed at a pixel region "P" defined by the region where the gate and data lines 32 and 34 cross. First and second polarizing plates 52 and 54, which transmit only light parallel to a polarizing axis, are disposed on an outer surface of the first and second substrates 10 and 30, respectively. An additional light source such as a backlight, for example, is disposed over the polarizing plate 54.

An aperture ratio of an LCD device is defined as a ratio of an area capable of displaying information to a total display area. As the aperture ratio increases, an area of a pixel electrode increases.

FIG. 2A is a cross-sectional view of an LCD device showing a TFT portion according to the related art. In FIG. 2A, first and second substrates 1 and 2 are arranged to oppose and face each other with a space formed therebetween. A gate electrode 31 is formed on an inner surface of the second substrate 2, and a gate insulating layer 33 is formed on the gate electrode 31. A semiconductor layer 36, formed by subsequently depositing an active layer 36a and an ohmic contact layer 36b, is formed on the gate insulating layer 33 over a gate electrode 31. Source and drain electrodes 38 and 40 spaced apart from each other are formed on the semiconductor layer 36 with a space between the source and drain electrodes 38 and 40, thereby forming a channel "ch" exposing the active layer 36a. The gate electrode 31, the semiconductor layer 36, and the source and drain electrodes 38 and 40 comprise a TFT "T". Moreover, a passivation layer 42 is formed on the TFT "T," and a pixel electrode 46 is formed on the passivation layer 42. The passivation layer 42 has a drain contact hole 44 that exposes a surface region of the drain electrode 40, and the pixel electrode 46 contacts the surface region of the drain electrode 40 through the drain contact hole 44 with the pixel region "P" (of FIG. 1). A second orientation film 48 is formed on the passivation layer 42 and the pixel electrode 46 to induce an alignment of a liquid crystal material layer 50. In addition, a color filter layer 13 and a black matrix 14 are formed on an inner surface of the first substrate 1 to overlap each other. A common electrode 16 and a first orientation film 18 are subsequently formed on the color filter layer 13 and the black matrix 14. Amorphous silicon (a-Si), which can be applied during a low temperature process, is mainly used as the semiconductor layer 36 of the second substrate 30. Since a photo current is generated in an a-Si TFT by light, the black matrix 14 is formed to cover the TFT "T".

FIG. 2B is a cross-sectional view of an LCD device showing a data line portion according to the related art. In FIG. 2B, a data line 34 and a pixel electrode 46 are formed to be spaced apart from one another on an inner surface of the second substrate 2. A black matrix having first and second regions "$d_1$" and "$d_2$" that correspond to a distance between adjacent pixel electrodes 46 and an attachment margin (about ±5 µm) are disposed on the inner surface of the first substrate 1, respectively. The second regions "$d_2$" of the black matrix 14 extend to overlap the pixel electrode 46 and surround a boundary (not shown) of the pixel electrode 46, thereby preventing light leakage at the first region "$d_1$" when the first and second substrates 1 and 2 are misaligned. Since the data line 34 is parallel to a long axis of the pixel electrode 46, the second region "$d_2$" over the data line 34 has a great influence on an aperture ratio of the LCD device.

FIG. 3 is a plan view of an LCD device according to the related art of a light-leaking region in a two-domain structure. An LCD device according to the related art has a mono-domain structure in which an alignment of a liquid crystal material is kept uniform through an entire substrate. Presently, an LCD device of a multi-domain structure is being developed in which one pixel region is divided by an electrical or intrinsic property of the liquid crystal material and the liquid crystal layers of the divided regions are aligned differently. In FIG. 3, a twisted nematic (TN) liquid crystal material of a normally white mode is used, and rubbing directions of first and second substrates are 45° and 135°, respectively. When a voltage is applied in an LCD device of a normally black mode, an additional shield for light leakage is not necessary, since the light-leaking region is a white line and the other region is white. When a voltage is not applied in the LCD device of a normally black mode, the light leakage region does not influence display quality, since the liquid crystal material is nearly parallel to the substrate. Accordingly, an LCD of a normally white mode is adopted in FIG. 3.

In FIG. 3, first light leakage regions "A" are generated long a direction parallel to a long axis of a pixel electrode, and a second light leakage region "B" is generated along the direction parallel to a short axis of the pixel electrode. The first light leakage regions "A" are located at opposite positions according to the domain, and the second light leakage region "B" is located at a border between the domains. When a voltage is applied, a reverse tilt domain whose alignment is reverse to that of liquid crystal is formed near the data line by a lateral electric field between the data line and the pixel electrode. Accordingly, liquid crystal material along a border between reverse tilt and normal domains are not controlled when a voltage is applied, since an alignment of the reverse tilt domain is reversed to an alignment of the liquid crystal material formed near the data line due to a lateral electric field between the data line and the pixel electrode. Thus, the first light leakage regions "A" are generated. Moreover, in the two-domain structure, since the liquid crystal material of the first and second domains are aligned along different directions from each other, a disclination is generated at a border between the first and second domains. Thus, the second light leakage region "B" is generated. Accordingly, in a multi-domain structure, a black matrix pattern should include light leakage regions by a disclination between domains and a lateral electric field between a data line and a pixel electrode.

FIG. 4 is a plan view of an LCD device according to the related art of a two-domain structure showing a black matrix pattern. In FIG. 4, a plurality of data lines 60 are spaced apart from each other, and a pixel electrode 62 is disposed between adjacent data lines 60. A black matrix pattern includes a first black matrix 64 corresponding to the data line 60 and a second black matrix 66 having first, second, and third sub-black matrix regions "$A_1$", "$B_1$" and "$C_1$," thereby the first and second black matrices 64 and 66 are interconnected. The first and second sub-black matrices "$A_1$" and "$B_1$" overlapping the pixel electrode 62 correspond to the first and second light leakage regions A and B (in FIG. 3). The third sub-black matrix "$C_1$" results from forming the black matrix pattern as a stripe, thereby reducing an aperture ratio without providing a shielding effect of the light leakage. Accordingly, since the black matrix pattern of a multi-domain structure includes sub-black matrices to shield light leakage at borders between the domains, the aperture ratio of a multi-domain structure additionally decreases in contrast with that of mono-domain structure.

SUMMARY OF THE INVENTION

Accordingly, the present invention is directed to a liquid crystal display device that substantially obviates one or more of the problems due to limitations and disadvantages of the related art.

An object of the present invention is to provide a liquid crystal display device in which a contrast ratio is not decreased and a loss of an aperture ratio is minimized.

Another object of the present invention is to provide a method of fabricating a liquid crystal display device in which a contrast ratio is not decreased and a loss of an aperture ratio is minimized.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device includes first and second substrates facing and spaced apart from each other, a common electrode on an inner surface of the first substrate, a gate line on an inner surface of the second substrate, a data line crossing the gate line, a switching device connected to the gate and data lines, a first pixel electrode connected to the switching device and spaced apart from the data line, a black matrix covering the data line and having a first portion width extending from a center line of the data line to a first edge of the black matrix, and a second portion width different from the first portion width extending from the center line of the data line to a second edge of the black matrix opposite to the first edge of the black matrix, and a liquid crystal material layer interposed between the first pixel electrode and common electrode.

In another aspect, a liquid crystal display device includes first and second substrates facing and spaced apart from each other, a common electrode on an inner surface of the first substrate, a gate line on an inner surface of the second substrate, a data line crossing the gate line, a pixel region defined by the gate and data lines having at least a first domain and a second domain extending along a direction of the data line, a switching device connected to the gate line and the data line, a pixel electrode connected to the switching device and spaced apart from the data line, a first liquid crystal material layer interposed between the pixel electrode and the common electrode corresponding to the first domain having a first alignment direction, a second liquid crystal material layer interposed between the pixel electrode and the common electrode corresponding to the second domain having a second alignment direction different from the first alignment direction, and a black matrix covering the data line having a first portion width extending perpendicular to the direction of the data line between a center line of the data line and a first edge of the black matrix adjacent to the first domain, and a second portion width different from the first portion width extending perpendicular to the direction of the data line between the center line of the data line and a second edge of the black matrix adjacent to the second domain.

In another aspect, a method of fabricating a liquid crystal display device includes providing a first substrate having a first surface and a second substrate having a second surface, forming a common electrode on the first surface of the first substrate, forming a gate line on the second surface of the second substrate, forming a data line crossing the gate line, forming a switching device connected to the gate and data lines, forming a first pixel electrode connected to the switching device and spaced apart from the data line, forming a black matrix covering the data line and having a first portion width extending from a center line of the data line to a first edge of the black matrix, and a second portion width different from the first portion width extending from the center line of the data line to a second edge of the black matrix opposite to the first edge of the black matrix, attaching the first and second substrate, thereby the first surface of the first substrate and the second surface of the second substrate being facing and spaced apart from each other, and forming a liquid crystal material layer interposed between the first pixel electrode and common electrode.

In another aspect, a method for fabricating a liquid crystal display device includes providing a first substrate having a first surface and a second substrate having a second surface, forming a common electrode on the first surface of the first substrate, forming a gate line on the second surface of the second substrate, forming a data line crossing the gate line, thereby a pixel region being defined by the gate and data lines and having a first and a second domain region, forming a switching device connected to the gate line and the data line, forming a pixel electrode connected to the switching device and spaced apart from the data line, forming a black matrix covering the data line having a first portion width extending perpendicular to the direction of the data line between a center line of the data line and a first edge of the black matrix adjacent to the first domain region, and a second portion width different from the first portion width extending perpendicular to the direction of the data line between the center line of the data line and a second edge of the black matrix adjacent to the second domain region, forming a first alignment layer on the common electrode, the first alignment layer having first and second regions extended along a direction of the data line, alignment directions of the first and second regions being different from each other, forming a second alignment layer at the pixel region of the second substrate, the second alignment layer having third and fourth regions extended along the direction of the data line, alignment directions of the third and fourth regions being different from each other, attaching the first and second substrates, thereby the first surface of the first substrate and the second surface of the second substrate being facing and spaced apart from each other, and forming a liquid crystal material layer interposed between the first and second alignment layers, thereby a first domain being defined by the first and third regions and a second domain being defined by the second and fourth regions.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
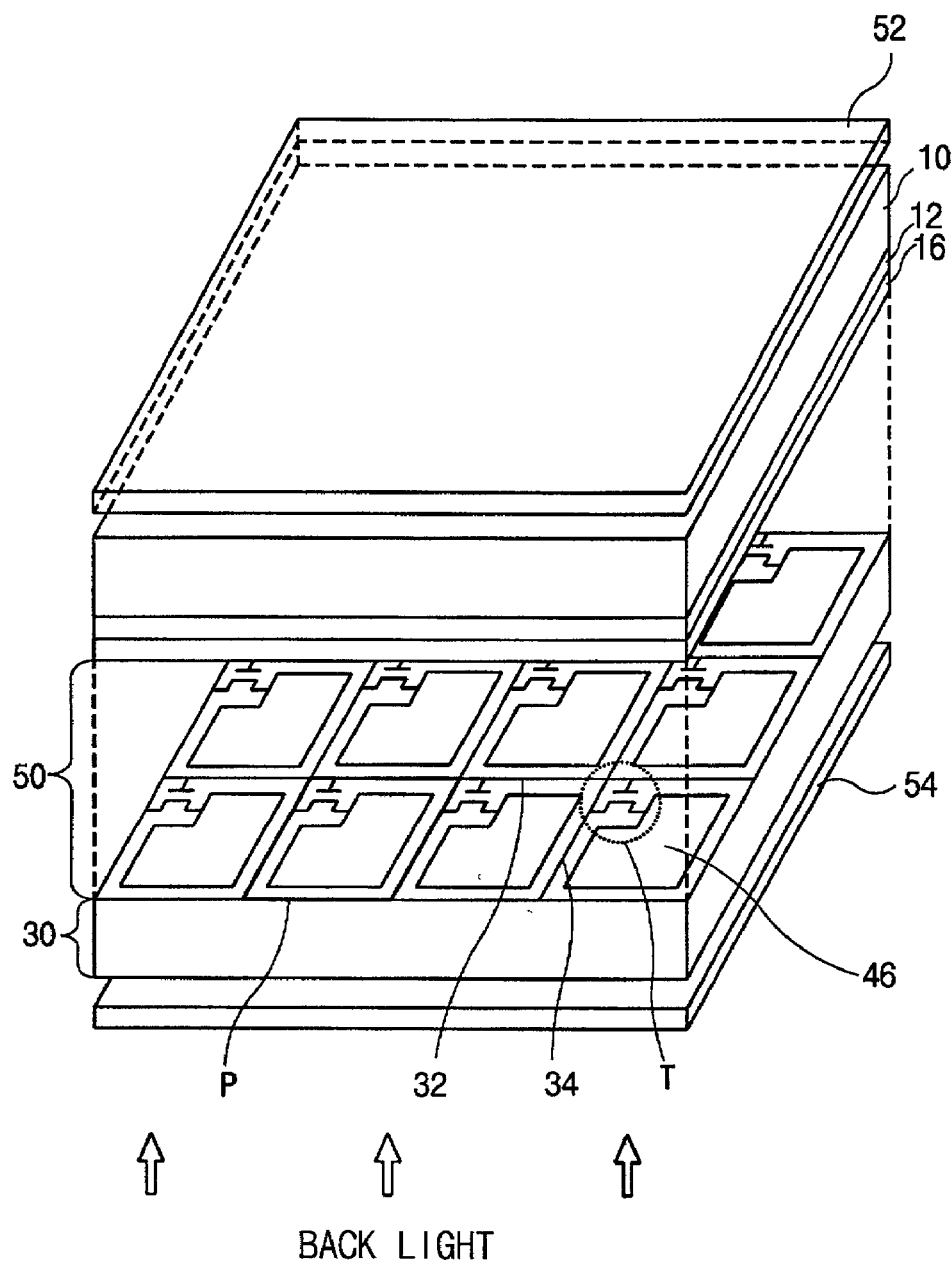
FIG. 1 is a perspective view of an LCD device according to the related art.
Figure 2A:
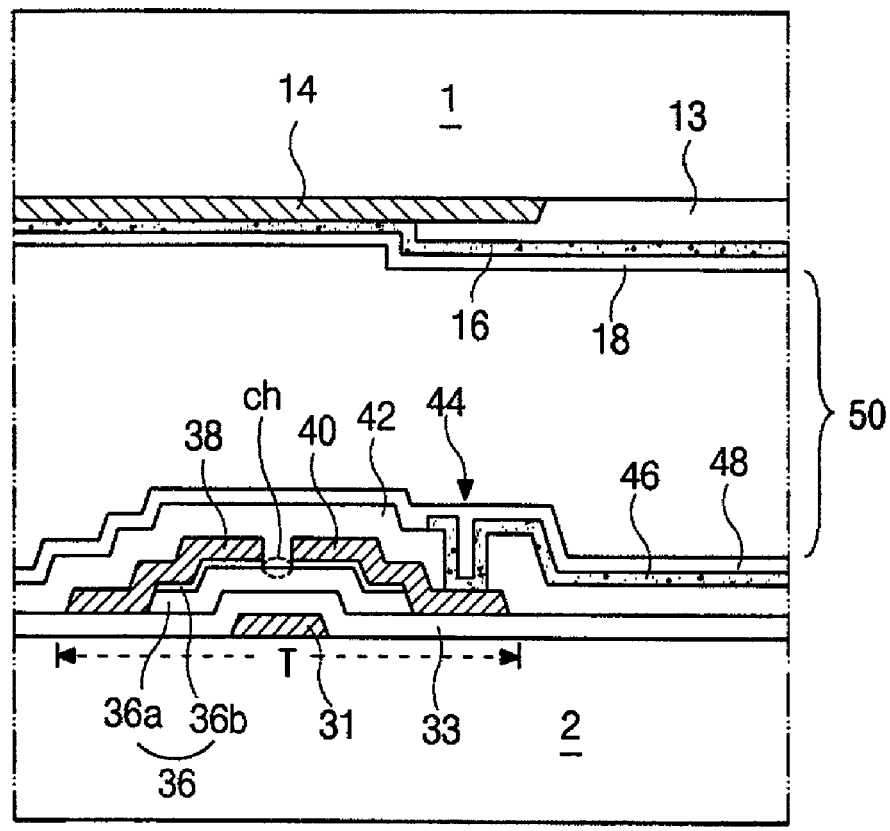
FIG. 2A is a cross-sectional view of an LCD device showing a TFT portion according to the related art.
Figure 2B:
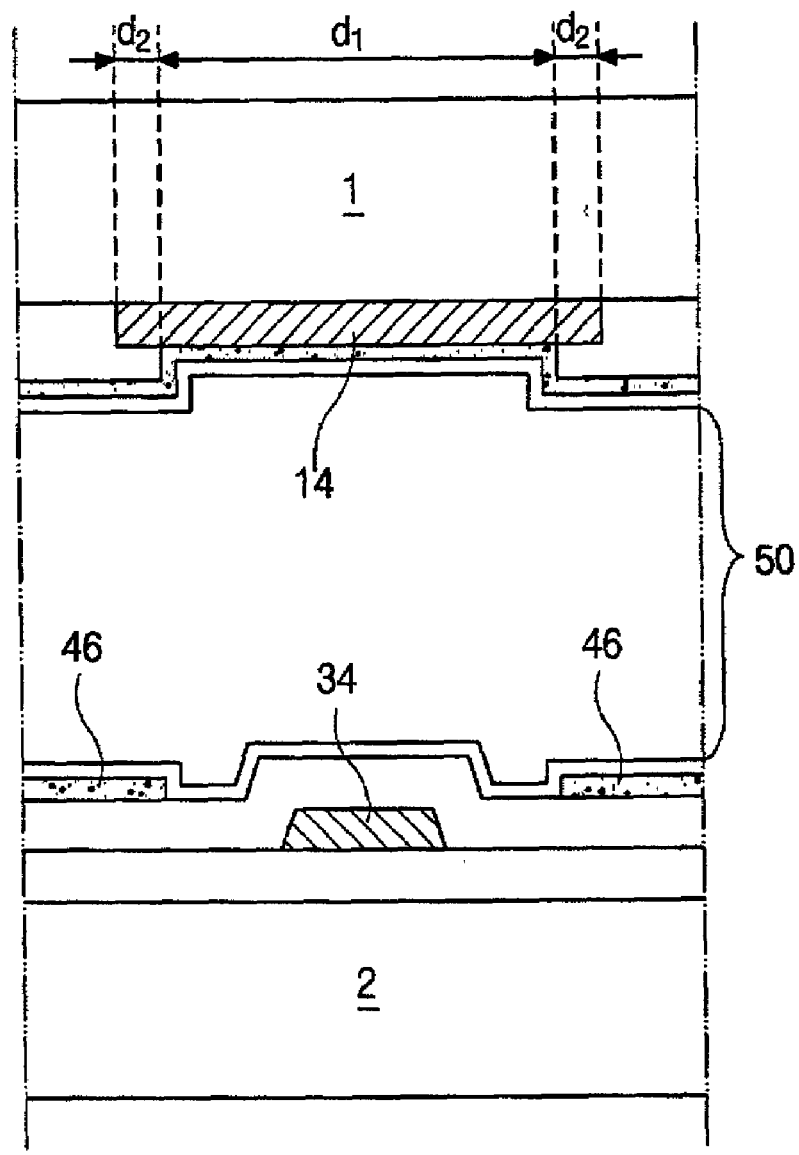
FIG. 2B is a cross-sectional view of an LCD device showing a data line portion according to the related art.
Figure 3:
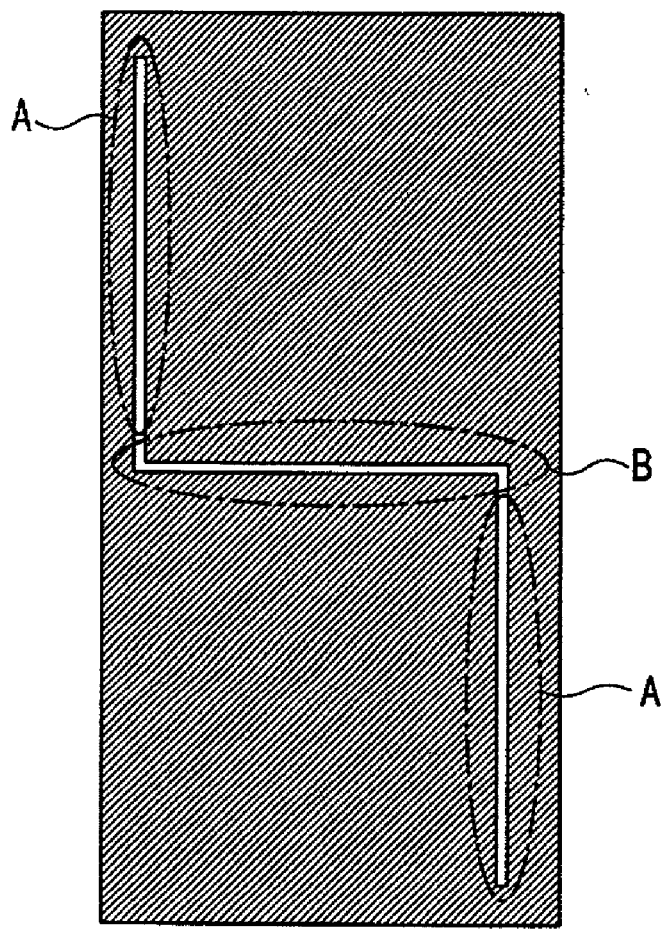
FIG. 3 is a plan view of an LCD device according to the related art of a light-leaking region in a two-domain structure.
Figure 4:
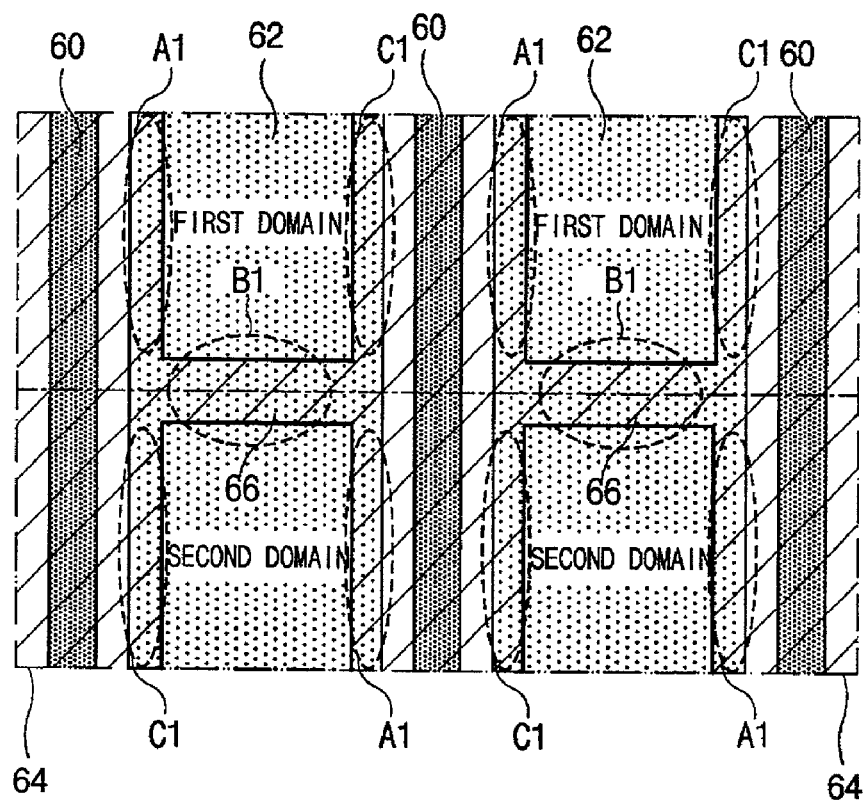
FIG. 4 is a plan view of an LCD device according to the related art of two-domain structure showing a black matrix pattern.
Figure 5A:
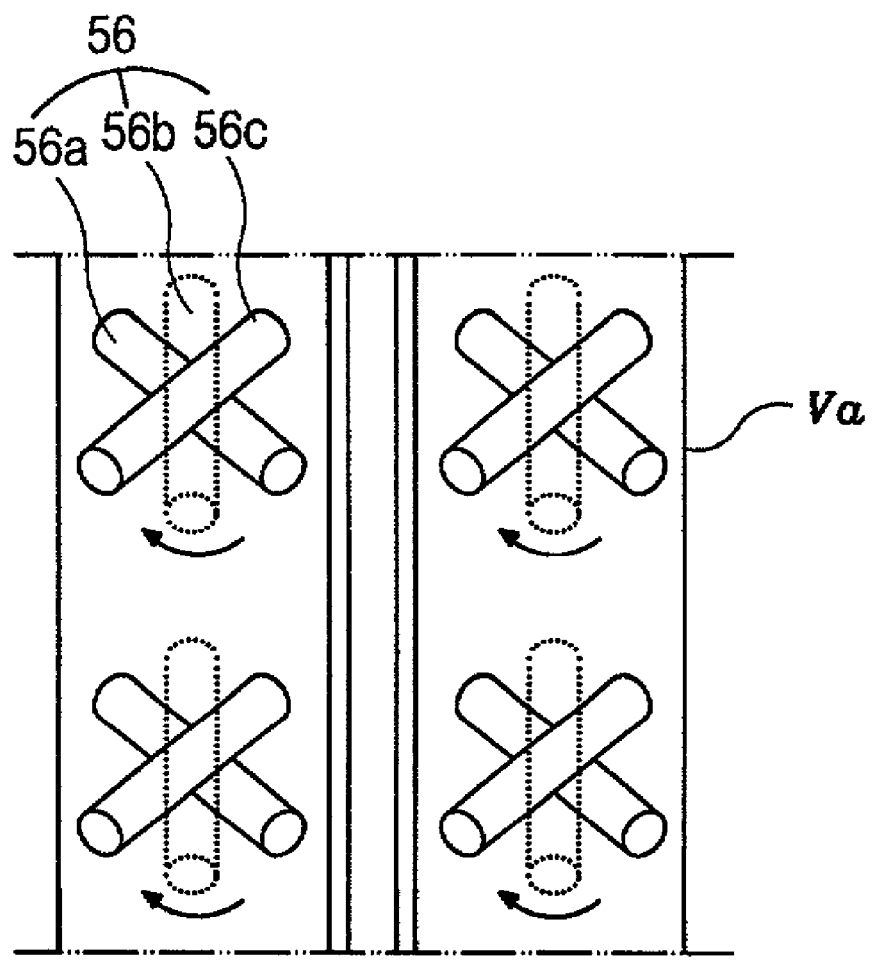
FIG. 5A is schematic view showing an alignment state of an LCD device of a mono-domain structure according to the present invention.
Figure 5B:
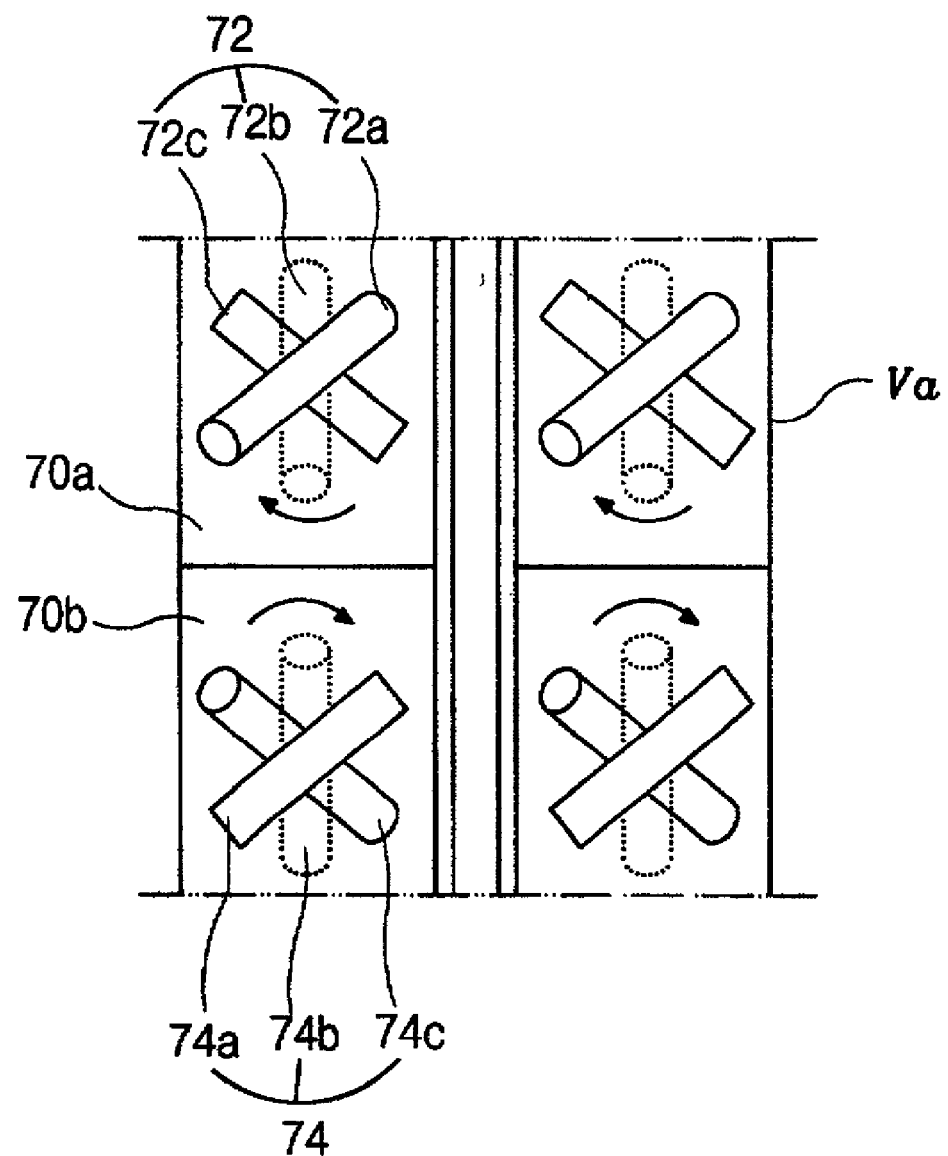
FIG. 5B is a schematic view showing an alignment state of an LCD device of a multi-domain structure according to the present invention.

FIG. 5A is schematic view showing an alignment state of an LCD device of a mono-domain structure, and FIG. 5B is a schematic view showing an alignment state of an LCD device of a multi-domain structure. In FIGS. 5A and 5B, an exemplary LCD device according to the present invention may be designed for a normally white mode, wherein a distance between a pixel electrode and a data line may be about 3 µm and a width of the data line may be about 8 µm. In FIG. 5A, rubbing directions of first and second substrates may be about 45° and 135°, respectively, and a liquid crystal material of a TN mode may be used. A liquid crystal layer "Va" disposed between a common electrode of the first substrate and the pixel electrode of the second substrate may include first, second, and third liquid crystal molecules 56a, 56b and 56c in accordance to an alignment state. The first and third liquid crystal molecules 56a and 56c may have a same pretilt angle and may be aligned perpendicular to each other, and the second liquid crystal molecule 56b may be aligned to have an angle of about 45° with respect to the first and third liquid crystal molecules 56a and 56c. In the mono-domain structure, the alignment directions of the liquid crystal molecule 56 may be uniform over an entirety of the liquid crystal layer "Va."

In FIG. 5B, rubbing directions of the first and second substrates may be about 45° and 135°, respectively, and a liquid crystal material of a dual-domain TN (DDTN) mode may be used. A liquid crystal material layer "Vb" may have first and second domains 70a and 70b. The liquid crystal material layer of the first domain 70a may include first, second, and third liquid crystal molecules 72a, 72b and 72c, and the liquid crystal material layer of the second domain 70b may include fourth, fifth, and sixth liquid crystal molecules 74a, 74b and 74c in accordance with an alignment state. The first liquid crystal molecule 72a of the first domain 70a may have a pretilt angle that corresponds to a pretilt angle of the sixth liquid crystal molecule 74c of the second domain 70b. In addition, the pretilt angles of the first and sixth liquid crystal molecules 72a and 74c may be larger than the pretilt angles of the third and fourth liquid crystal molecules 72c and 74a. Therefore, the first and second domain 70a and 70b may have larger pretilt angles at different substrates such that the liquid crystal molecules 72 and 74 of the first and second domains 70a and 70b may be aligned along opposite directions when a voltage is applied.

Figure 6:
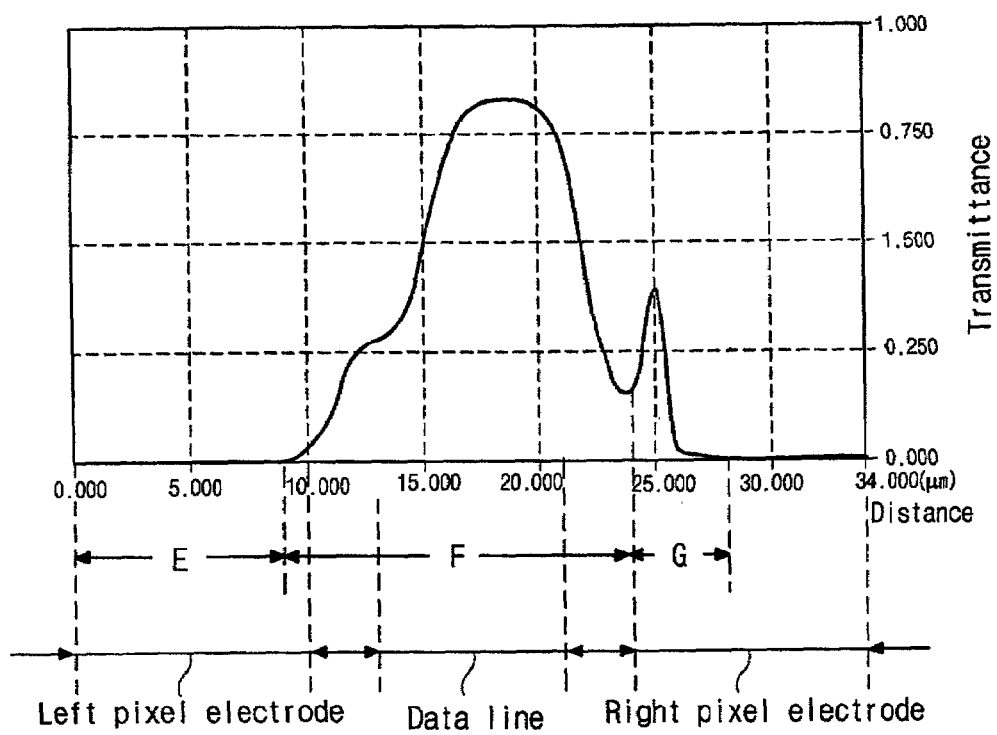
FIG. 6 is a graph showing transmittance of a liquid crystal layer of FIG. 5A with respect to a lateral distance from a data line.
Figure 7A:
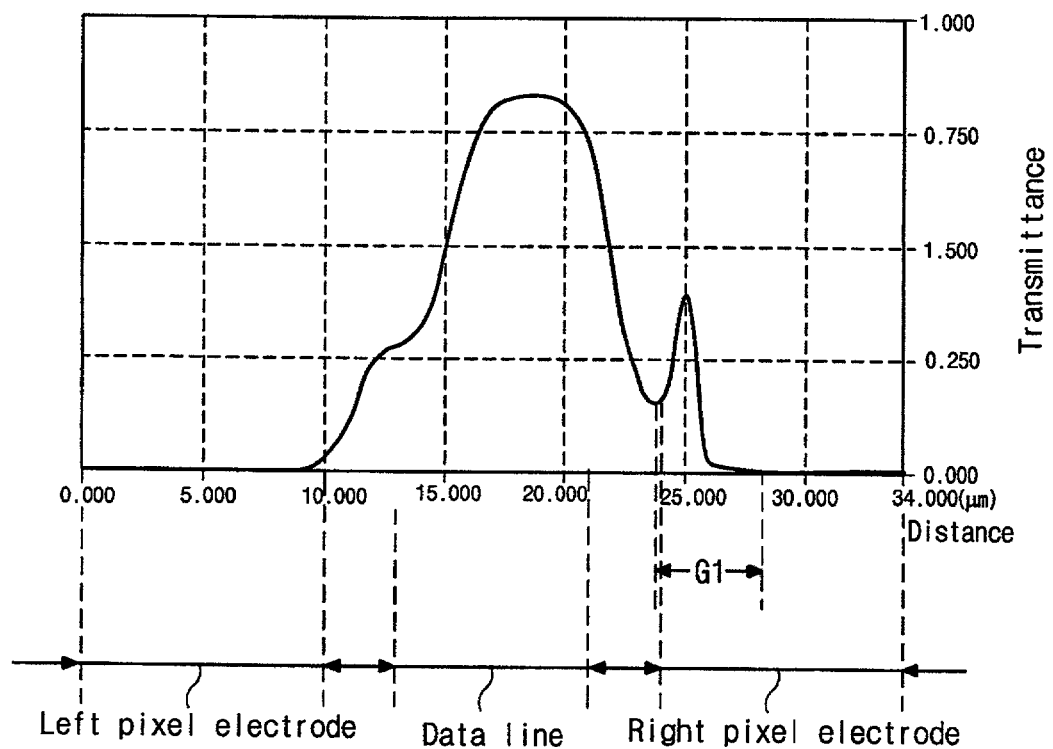
FIG. 7A is a graph showing transmittance of a liquid crystal layer of a first domain of FIG. 5B with respect to a lateral distance from a data line.
Figure 7B:
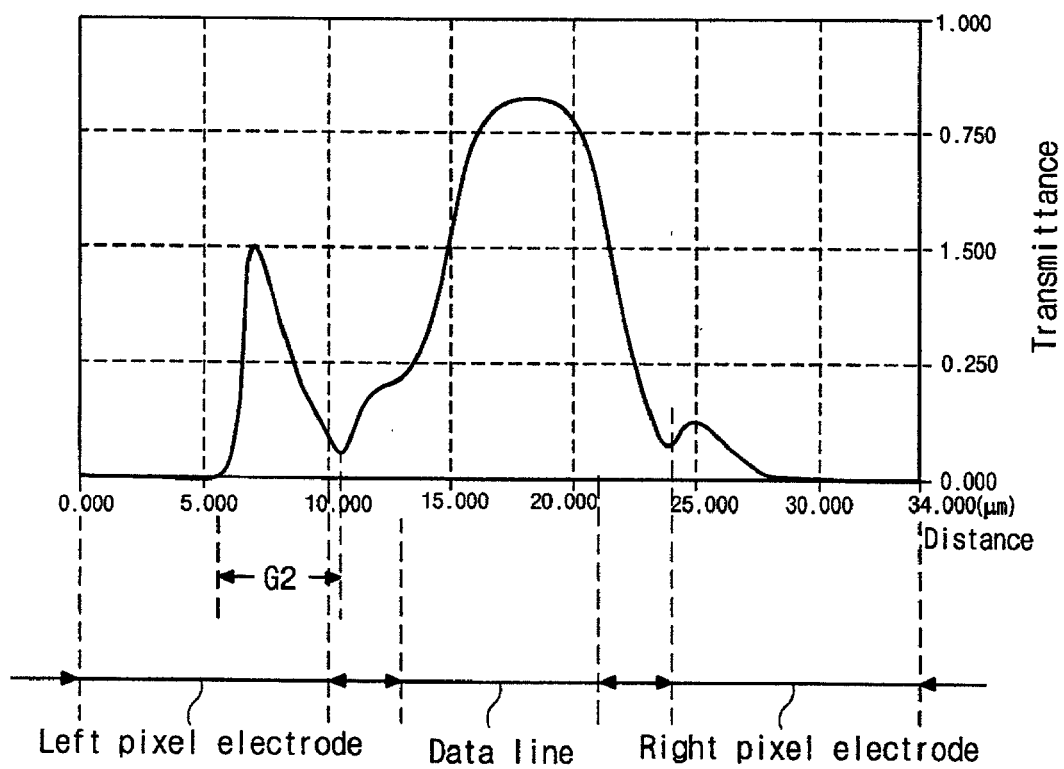
FIG. 7B is a graph showing transmittance of a liquid crystal layer of a second domain of FIG. 5B with respect to a later distance from a data line.

FIG. 6 is a graph showing transmittance of a liquid crystal layer of FIG. 5A with respect to a lateral distance from a data line, FIG. 7A is a graph showing transmittance of a liquid crystal layer of a first domain of FIG. 5B with respect to a lateral distance from a data line, and FIG. 7B is a graph showing transmittance of a liquid crystal layer of a second domain of FIG. 5B with respect to a later distance from a data line. In FIGS. 6, 7A and 7B, a first portion of an x-axis corresponds to a portion of a left pixel electrode within a range of 0 μm to 10 μm, a second portion of the x-axis corresponds to a space portion between the left pixel electrode and a data line within a range of 10 μm to 13 μm, a third portion of the x-axis corresponds to the data line portion within a range of 13 μm to 21 μm, a fourth portion of the x-axis range corresponds to a space portion between the data line and a right pixel electrode within range of 21 μm to 24 μm, and a fifth portion of the x-axis corresponds to a portion of the right pixel electrode within a range of 24 μm to 34 μm.

In FIG. 6, a lateral distance of the x-axis includes first, second and third ranges "E", "F" and "G". Within the first range "E," a liquid crystal material layer that corresponds to the left pixel electrode may be aligned to shield light, whereby a nearly perfect black state may be attained with a transmittance close to 0.000. Within the second range "F," a liquid crystal material layer that corresponds to the data line is not aligned, whereby a white state may be attained with a transmittance close to 1.000. Within the third range "G," a light leakage phenomenon occurs due to an alignment of a liquid crystal material layer in a vicinity of a data line. The third range "G" corresponds to a range of 23.75 μm to 26.25 μm (Δ 2.50 μm), i.e., a boundary of the right pixel electrode and the light leakage phenomenon occurs therein due to the lateral electric field between the data line and the pixel electrode. The light leakage is not measured equally in right and left pixel electrodes of the data line, but within a specific range according to the alignment of the liquid crystal material layer. For example, if a liquid crystal molecule is aligned as shown in FIG. 5A, then the light leakage phenomenon occurs at the right pixel electrode of the data line.

In FIGS. 7A and 7B, the light leakage phenomena occur in a fourth range "$G_1$" of 23.75 μm to 32.50 μm (Δ 8.75 μm), and in a fifth range "$G_2$" of 6.25 μm to 11.25 μm (Δ 5.00 μm). For example, if the liquid crystal molecules are aligned as those of the first and second domains 70a and 70b of FIG. 7B, then the light leakage phenomena occur at the right pixel electrode of the data line in FIG. 7A and at the left pixel electrode of the data line in FIG. 7B. Accordingly, a portion of light leakage may be dependent upon an alignment direction of the liquid crystal molecule.

In order to prevent the light leakage phenomenon without reduction of the aperture ratio, the black matrix pattern may be selectively extended. For example, the black matrix pattern that corresponds to the distance between the adjacent pixel electrodes has an asymmetric shape with respect to the data line. The asymmetric extended portion is within a range of 2 μm to 8 μm. Alternatively, the position and the shape of the data line and the pixel electrode may be changed to prevent the light leakage phenomenon.

Figure 8:
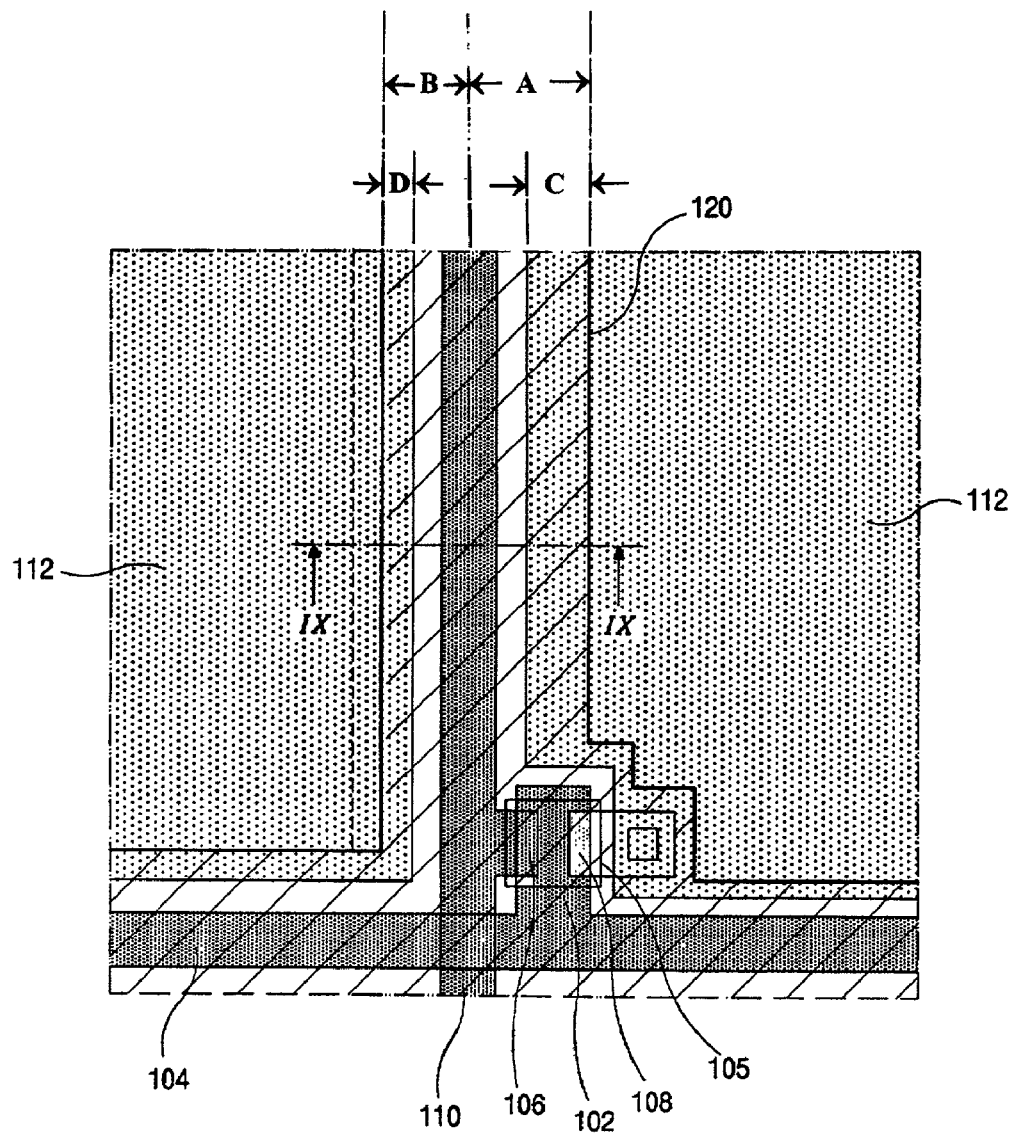
FIG. 8 is a plan view of an exemplary LCD device according to the present invention.

FIG. 8 is a plan view of an exemplary LCD device according to the present invention. In FIG. 8, a gate line 104 may be formed along a first direction and a data line 110 crossing the gate line 104 may be formed along a second direction. In a vicinity of the crossing portions of the gate and data line 104 and 110, a TFT may be formed. A pixel electrode 112 may be formed at a pixel region defined by the gate and data line 104 and 110, and may be connected to the TFT. The TFT may include a gate electrode 102 that extends from the gate line 104, a semiconductor layer 105 formed on the gate electrode 102, a source electrode 106 that extends from the data line 104, and a drain electrode 108 that is spaced apart from the source electrode 106 and connects the pixel electrode 112 to the TFT.

A black matrix 120 may extend asymmetrically to cover an area between adjacent pixel electrodes 112, and may include the gate and data lines 104 and 110 and the TFT. The black matrix 120 may also cover a portion of the pixel electrode 112 due to an alignment margin. Since the light leakage region between the pixel electrode 112 and the data line 110 is dependent upon the alignment direction of the liquid crystal material layer, the portion of the black matrix 120 covering the pixel electrode 112 may be selectively extended. Accordingly, since the light leakage phenomenon occurs only at a right portion with respect to the data line 110, the black matrix corresponding to the right portion may be selectively extended, thereby improving the aperture ratio.

For example, the black matrix 120 may extend along a first direction perpendicular to a direction of the data line 110 by an amount A from a center line of the data line 110 to an edge portion of the pixel electrode 112. Furthermore, the black matrix 120 may extend along a second direction opposite to the first direction by an amount B from the center line of the data line 110 to an edge portion of an adjacent pixel electrode 112. Accordingly, the amount A may be greater than the amount B. In addition, the black matrix 120 may extend along the first direction by an amount C from an edge portion of the pixel electrode 112 closest to the data line 110. Furthermore, the black matrix may extend along the second direction by an amount D from an edge portion of the adjacent pixel electrode 112 closest to the data line 110. Accordingly, the amount C may be greater than the amount D.

Figure 9:
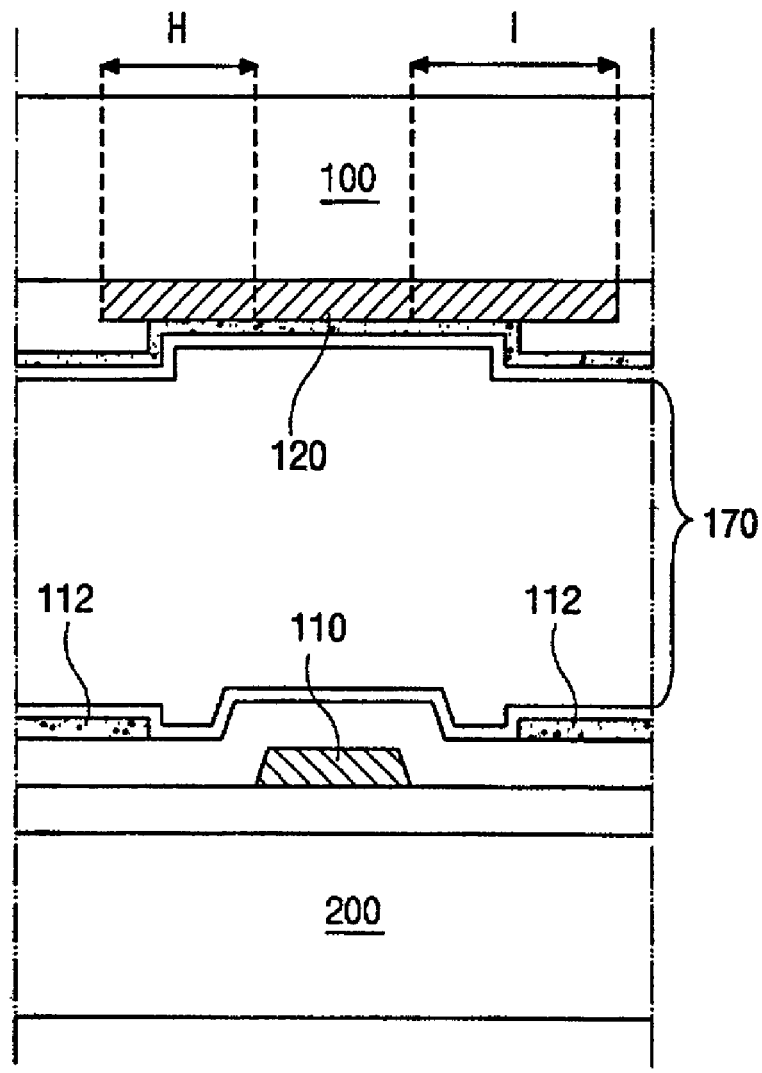
FIG. 9 is a cross-sectional view of the exemplary LCD device of FIG. 8 along line IX-IX according to the present invention.

FIG. 9 is a cross-sectional view of the exemplary LCD device of FIG. 8 along line IX-IX according to the present invention. In FIG. 9, first and second substrates 100 and 200 may be facing and spaced apart from each other, and a liquid crystal material layer 170 may be interposed therebetween. A pixel electrode 112 may be disposed along both sides of a data line 110 on an inner surface of the second substrate 200. The pixel electrode 112 may be spaced apart from the data line 110. A black matrix 120 may be formed on an inner surface of the first substrate 100 that corresponds to the data line 110. Overlapping areas of the black matrix 120 and the pixel electrode 112 may be asymmetric with respect to the data line 110. Accordingly, since the black matrix 120 may be selectively extended only to a light-leaking region, the aperture ratio is greatly improved. For example, in case of a sub-pixel having a size of 93 μm×279 μm, if the black matrix is diminished by 1 μm in width, the aperture ratio can increase more than 1%. The liquid crystal material layer 170 may be one of a horizontally oriented twisted nematic (TN), an electrically controlled birefringence (ECB) normally white mode, and an optically compensated birefringence (OCB) mode of the ECB mode.

Alternatively, the black matrix 120 may be formed upon a color filter layer of a TFT-on-Color Filter (TOC) structure, or upon a color filter layer of a Color Filter-on-TFT (COT) structure. For example, the black matrix 120 may be formed either under or over the switching device of the second substrate 200. Furthermore, the black matrix according to the present invention can be applied to an LCD device in which the color filter layer and the switching device are formed on the same substrate.

Figure 10:
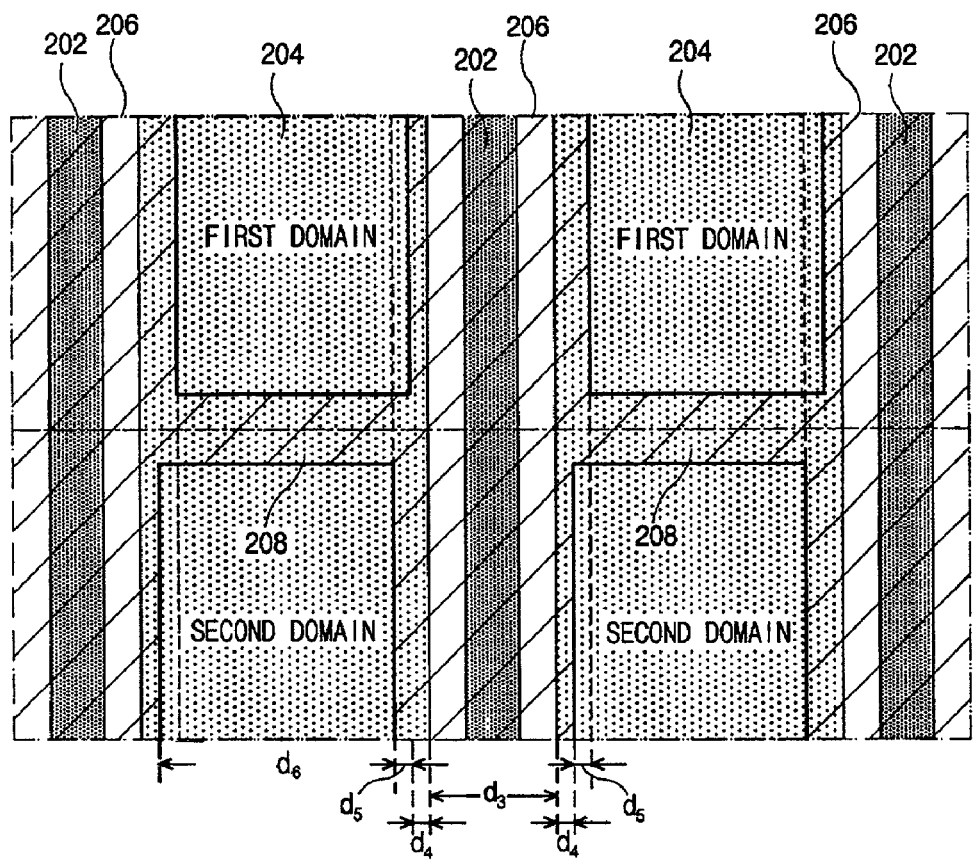
FIG. 10 is a plan view of another exemplary LCD device according to the present invention.

FIG. 10 is a plan view of another exemplary LCD device according to the present invention. In FIG. 10, a plurality of data lines 202 may be spaced apart from each other and a pixel electrode 204 may be disposed at a pixel region between the plurality of data lines 202, wherein the pixel region of a multi-domain structure may have a first domain (FIRST DOMAIN) and a second domain (SECOND DOMAIN). The multi-domain structure may be formed through a rubbing method using a mechanical friction or an optical alignment method, for example, in which pretilt angles of the first and second substrates are different from each other due to irradiation of infrared light upon the first and second substrates. In the optical alignment method, for example, an orientation film may include a material of a polyimide family. In the first domain (FIRST DOMAIN), the pretilt angle of the second substrate is reduced through a depolymerization of the polyimide by the irradiation of infrared light so that the pretilt angle of the second substrate is lower than the pretilt angle of the first substrate. Alternatively, in the second domain (SECOND DOMAIN), the pretilt angle of the first substrate may be formed to be lower than the pretilt angle of the second substrate. The material for the orientation film may be selected from a polymer material having one of a decomposition reaction, a dimerization reaction, and a isomerization reaction by the irradiation of infrared light.

In FIG. 10, a black matrix pattern may include a first black matrix 206 that corresponds to the data line 202 and a second black matrix 208 that covers a border between the first domain (FIRST DOMAIN) and the second domain (SECOND DOMAIN). The first black matrix 206 may have an asymmetric structure with respect to the data line 202, wherein an asymmetric side of the first domain (FIRST DOMAIN) may be different from an asymmetrical side of the second domain (SECOND DOMAIN). Within the first black matrix 206, a first interval "$d_3$" may be defined as a region between adjacent pixel electrodes 204 including the data line 202, a second interval "$d_4$" may be defined as a region that overlaps the pixel electrode 204 of the second domain (SECOND DOMAIN) due to the alignment margin, a third interval "$d_5$" may be defined as a light leakage region between an edge portion of the first domain (FIRST DOMAIN) and the second domain (SECOND DOMAIN) according to the alignment state of the liquid crystal material layer, and a fourth interval "$d_6$" may be defined as a region where the black matrix pattern is eliminated, specifically the region overlying the first domain (FIRST DOMAIN) and the second domain (SECOND DOMAIN). Accordingly, the aperture ratio increases by an amount corresponding to the fourth interval "$d_6$." The second black matrix 208 can be formed at different positions with different sizes according to a total number of domains. Moreover, an extra pattern of metallic material for the gate line or data line may be formed at the position of the second black matrix 208.

Figure 11:
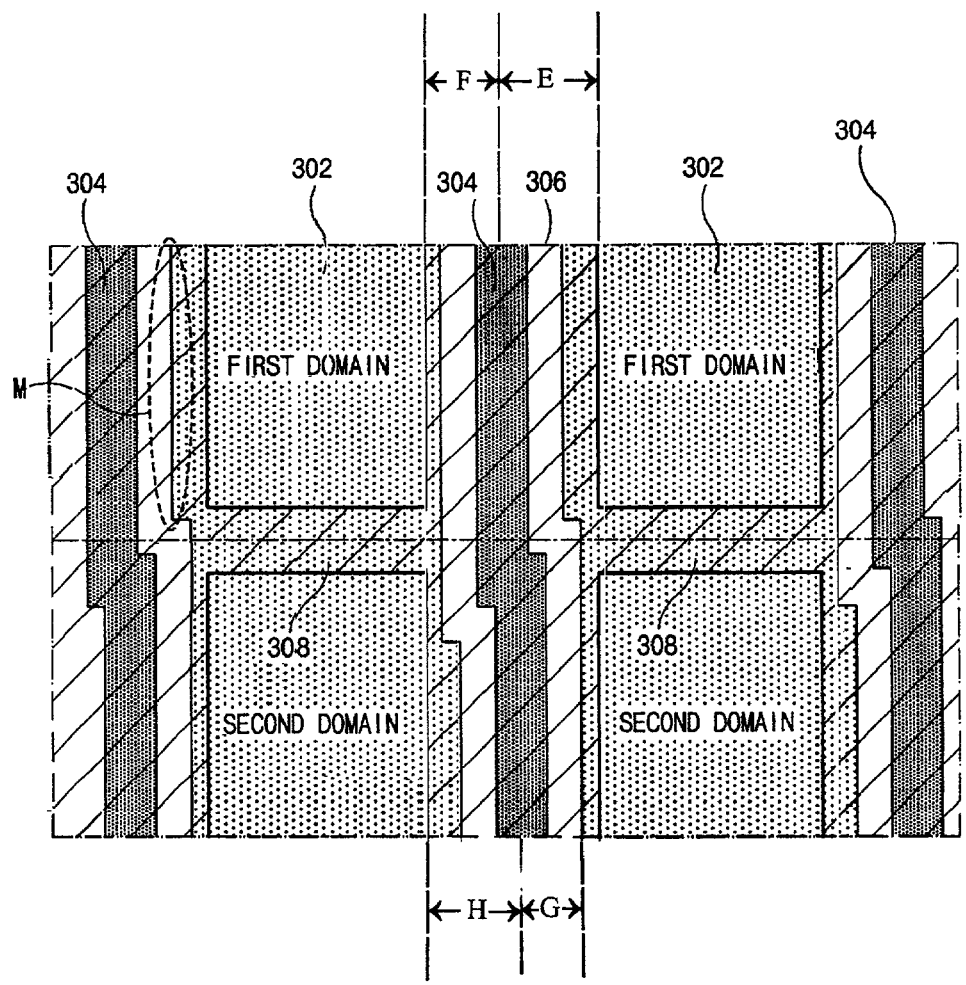
FIG. 11 is a plan view of another exemplary LCD device according to the present invention.

FIG. 11 is a plan view of another exemplary LCD device according to the present invention. In FIG. 11, a pixel electrode 302 and a data line 304 having an asymmetric structure with respect to a border between a first domain (FIRST DOMAIN) and a second domain (SECOND DOMAIN) may be spaced apart from each other. A first black matrix 306 and a second black matrix 308 may be formed in a matrix pattern. The first black matrix 306 may be formed between adjacent first domains (FIRST DOMAIN) disposed along a first direction perpendicular to a second direction of the data line 304 and second domains (SECOND DOMAIN) disposed along the first direction. The second black matrix 308 may be formed between adjacent first domains (FIRST DOMAIN) and second domains (SECOND DOMAIN) disposed along the second direction.

For example, the first black matrix 306 may include a first region that extends along a first direction perpendicular to a direction of the data line 304 by an amount E from a center line of the data line 304 to an edge portion of the pixel electrode 302 of a first domain (FIRST DOMAIN). Furthermore, the first region of the first black matrix 306 may extend along a second direction opposite to the first direction by an amount F from the center line of the data line 304 to an edge portion of an adjacent pixel electrode 302 of an adjacent first domain (FIRST DOMAIN). Accordingly, the amount E may be greater than the amount F.

In addition, the first black matrix 306 may include a second region that extends along the first direction by an amount G from a center line of the data line 304 to an edge portion of a second domain (SECOND DOMAIN). Furthermore, the second region of the first black matrix 306 may extend along the second direction by an amount H from the center line of the data line 304 to an edge portion of an adjacent second domain (SECOND DOMAIN). Accordingly, the amount G may be less than the amount H.

Furthermore, each of the pixel electrodes 302 may include a protrusion M for a light leakage region. Accordingly, each of the first domains (FIRST DOMAIN) may have the protrusions M extending along a first side of the first domains (FIRST DOMAINS), and each of the second domains (SECOND DOMAIN) may the protrusions M extending along a second side of the second domains (SECOND DOMAIN), wherein the first side of the first domain (FIRST DOMAIN) and the second side of the second domains (SECOND DOMAIN) are opposite to each other.

The present invention may be applied to an LCD device of mono-domain structure. Accordingly, in a mono-domain structure, the second black matrix may be eliminated.

It will be apparent to those skilled in the art that various modifications and variations can be made in the liquid crystal display device and method of fabricating the same of the present invention without departing from the spirit or scope of the invention. Thus, it is intended that the present invention covers the modifications and variations of this invention provided they come within the scope of the appended claims and their equivalents.

What is claimed is:
1. A liquid crystal display device, comprising:
first and second substrates facing and spaced apart from each other;
a common electrode on an inner surface of the first substrate;
a gate line on an inner surface of the second substrate;
a data line crossing the gate line;
a pixel region defined by the gate and data lines having at least a first domain and a second domain extending along a direction of the data line;
a switching device connected to the gate line and the data line;
a pixel electrode connected to the switching device and spaced apart from the data line;
a first liquid crystal material layer interposed between the pixel electrode and the common electrode corresponding to the first domain having a first alignment direction;
a second liquid crystal material layer interposed between the pixel electrode and the common electrode corresponding to the second domain having a second alignment direction different from the first alignment direction; and
a black matrix covering the data line, the black matrix having a first segment corresponding to the first domain and a second segment corresponding to the second domain such that a central line of the black matrix at the first segment is shifted with respect to a central line of the black matrix at the second segment, the black matrix further having a first segment width extending perpendicular to the direction of the data line between a center line of the data line and a first edge of the black matrix adjacent to the first domain, and a second segment width different from the first segment width extending perpendicular to the direction of the data line between the center line of the data line and a second edge of the black matrix adjacent to the second domain, wherein the data line has a straight shape and the black matrix has a bent shape in the direction of the data line, and wherein the first and second segment widths are asymmetrically formed according to an alignment direction of the first and second liquid crystal material layers, respectively.

2. The device according to claim 1, wherein the black matrix has a third width extending along the direction of the data line between the first and second domains.

3. The device according to claim 1, wherein the data line and the pixel electrode are stripe-shaped in the pixel region.

4. The device according to claim 1, wherein a difference between the first segment width and the second segment width is within a range of about 2 μm to about 8 μm.

5. The device according to claim 1, wherein the first segment is adjacent to the first domain along substantially an entire length thereof in a direction parallel to the data line but absent from areas adjacent to the second domain, and wherein the second segment is adjacent to the second domain along substantially an entire length thereof in a direction parallel to the data line but absent from areas adjacent to the first domain.

6. The device according to claim 1, wherein the bend of the black matrix is adjacent to a boundary between the first and second domains.

7. The device according to claim 1, wherein the first segment further includes a third edge and the second segment further includes a fourth edge, the first, second, third and fourth edges being non-collinear.

8. A method for fabricating a liquid crystal display device, comprising steps of:

providing a first substrate having a first surface and a second substrate having a second surface;

forming a common electrode on the first surface of the first substrate;

forming a gate line on the second surface of the second substrate;

forming a data line crossing the gate line, thereby a pixel region being defined by the gate and data lines and having a first domain region and a second domain region;

forming a switching device connected to the gate line and the data line;

forming a pixel electrode connected to the switching device and spaced apart from the data line;

forming a black matrix covering the data line, the black matrix having a first segment corresponding to the first domain and a second segment corresponding to the second domain such that a central line of the black matrix at the first segment is shifted with respect to a central line of the black matrix at the second segment, the black matrix further having a first segment width extending perpendicular to the direction of the data line between a center line of the data line and a first edge of the black matrix adjacent to the first domain region, and a second segment width different from the first segment width extending perpendicular to the direction of the data line between the center line of the data line and a second edge of the black matrix adjacent to the second domain region portion, wherein the data line has a straight shape and the black matrix has a bent shape in the direction of the data line;

forming a first alignment layer on the common electrode, the first alignment layer having first and second regions extended along a direction of the data line, alignment directions of the first and second regions being different from each other;

forming a second alignment layer at the pixel region of the second substrate, the second alignment layer having third and fourth regions extended along the direction of the data line, alignment directions of the third and fourth regions being different from each other;

attaching the first and second substrates, thereby the first surface of the first substrate and the second surface of the second substrate being facing and spaced apart from each other; and forming a liquid crystal material layer interposed between the first and second alignment layers, thereby a first domain being defined by the first and third regions and a second domain being defined by the second and fourth regions, wherein the first and second segment widths are asymmetrically formed according to an alignment direction of the liquid crystal material layer.

9. The method according to claim 8, wherein the black matrix has a third width extending along the direction of the data line between the first and second domains.

10. The method according to claim 8, wherein the data line and the pixel electrode are stripe-shaped in the pixel region.

11. The method according to claim 8, wherein a difference between the first segment width and the second segment width is within a range of about 2 μm to about 8 μm.

12. The method according to claim 8, wherein the first segment is adjacent to the first domain along substantially an entire length thereof in a direction parallel to the data line but absent from areas adjacent to the second domain, and wherein the second segment is adjacent to the second domain along substantially an entire length thereof in a direction parallel to the data line but absent from areas adjacent to the first domain.

13. The method according to claim 8, wherein the bend of the black matrix is adjacent to a boundary between the first and second domains.

14. The method according to claim 8, wherein the first segment further includes a third edge and the second segment further includes a fourth edge, the first, second, third and fourth edges being non-collinear.

15. A liquid crystal display device, comprising:

first and second substrates facing and spaced apart from each other;

a common electrode on an inner surface of the first substrate;

a gate line on an inner surface of the second substrate;

a data line crossing the gate line, the data line having a first segment corresponding to the first domain and a second segment corresponding to the second domain such that a first center line of the data line at the first segment is shifted with respect to a second center line of the data line at the second segment;

a pixel region defined by the gate and data lines having at least a first domain and a second domain extending along a direction of the data line;

a switching device connected to the gate line and the data line;

a pixel electrode connected to the switching device and spaced apart from the data line;

a first liquid crystal material layer interposed between the pixel electrode and the common electrode corresponding to the first domain having a first alignment direction;

a second liquid crystal material layer interposed between the pixel electrode and the common electrode corresponding to the second domain having a second alignment direction different from the first alignment direction; and a black matrix covering the data line, the black matrix having a first segment width extending perpendicular to the direction of the data line between the first center line of the data line and a first edge of the black matrix adjacent to the first domain, and a second segment width different from the first segment width extending perpendicular to the direction of the data line between the second center line of the data line and a second edge of the black matrix adjacent to the second domain, wherein the data line has a bent shape and the black matrix has a straight shape in the direction of the data line, and wherein the first and second segment widths are asymmetrically formed according to an alignment direction of the first and second liquid crystal material layers, respectively.

16. The device according to claim 15, wherein the pixel electrode includes a first protrusion that corresponds to the first domain and extends along a first direction perpendicular to the direction of the data line, and a second protrusion that corresponds to the second domain and extends along a second direction perpendicular to the direction of the data line and opposite to the first direction, wherein the first and second protrusions are parallel to the inner surface of the second substrate.

17. The device according to claim 15, wherein the black matrix has a third width extending along the direction of the data line between the first and second domains.

18. The device according to claim 15, wherein a difference between the first segment width and the second segment width is within a range of about 2 µm to about 8 µm.

19. The device according to claim 15, wherein the first segment is adjacent to the first domain along substantially an entire length thereof but absent from areas adjacent to the second domain, and wherein the second segment is adjacent to the second domain along substantially an entire length thereof but absent from areas adjacent to the first domain.

20. The device according to claim 15, wherein the bend of the data line is adjacent to a boundary between the first and second domains.

21. The device according to claim 15, wherein the first segment further includes a third edge and the second segment further includes a fourth edge, the first, second, third and fourth edges being non-collinear.

22. A method for fabricating a liquid crystal display device, comprising steps of:

providing a first substrate having a first surface and a second substrate having a second surface;

forming a common electrode on the first surface of the first substrate;

forming a gate line on the second surface of the second substrate;

forming a data line crossing the gate line, thereby a pixel region being defined by the gate and data lines, the data line having a first segment corresponding to the first domain and a second segment corresponding to the second domain such that a first center line of the data line at the first segment is shifted with respect to a second center line of the data line at the second segment;

forming a switching device connected to the gate line and the data line;

forming a pixel electrode connected to the switching device and spaced apart from the data line;

forming a black matrix covering the data line, the black matrix having a first segment width extending perpendicular to the direction of the data line between a center line of the data line and a first edge of the black matrix adjacent to the first domain region, and a segment width different from the first segment width extending perpendicular to the direction of the data line between the center line of the data line and a second edge of the black matrix adjacent to the second domain region, wherein the data line has a bent shape and the black matrix has a straight shape in the direction of the data line;

forming a first alignment layer on the common electrode, the first alignment layer having first and second regions extended along a direction of the data line, alignment directions of the first and second regions being different from each other;

forming a second alignment layer at the pixel region of the second substrate, the second alignment layer having third and fourth regions extended along the direction of the data line, alignment directions of the third and fourth regions being different from each other;

attaching the first and second substrates, thereby the first surface of the first substrate and the second surface of the second substrate being facing and spaced apart from each other; and forming a liquid crystal material layer interposed between the first and second alignment layers, thereby a first domain being defined by the first and third regions and a second domain being defined by the second and fourth regions, wherein the first and second segment widths are asymmetrically formed according to an alignment direction of the liquid crystal material layer.

23. The method according to claim 22, wherein the pixel electrode includes a first protrusion that corresponds to the first domain and extends along a first direction perpendicular to the direction of the data line, and a second protrusion that corresponds to the second domain and extends along a second direction perpendicular to the direction of the data line and opposite to the first direction, wherein the first and second protrusions are parallel to the inner surface of the second substrate.

24. The method according to claim 22, wherein the black matrix has a third width extending along the direction of the data line between the first and second domains.

25. The method according to claim 22, wherein a difference between the first segment width and the second segment width is within a range of about 2 µm to about 8 µm.

26. The method according to claim 22, wherein the first segment is adjacent to the first domain along substantially an entire length thereof but absent from areas adjacent to the second domain, and wherein the second segment is adjacent to the second domain along substantially an entire length thereof but absent from areas adjacent to the first domain.

27. The method according to claim 22, wherein the bend of the data line is adjacent to a boundary between the first and second domains.

28. The method according to claim 22, wherein the first segment further includes a third edge and the second segment further includes a fourth edge, the first, second, third and fourth edges being non-collinear.

* * * * *